UNITED STATES PATENT OFFICE 2,015,256

FOOD PRODUCT

Forest H. Clickner, Chicago, Ill., assignor to Kraft-Phenix Cheese Corporation, Chicago, Ill., a corporation of Delaware No Drawing. Application May 12, 1934, Serial No. 725,346

3 Claims. (Cl. 99—11)

My invention relates to a food product and has to do more particularly with a cheese which is especially adaptable for use in connection with bakery goods, and a shortening material containing such cheese. More specifically, my improved products may be used as a coating or filler for crackers, popcorn, etc.

While cheese has been used for a long time in connection with panified products, it has never been completely satisfactory for the reason that the usual cheeses and cheese fillings as previously used contain substantial amounts of water which induces saponification of the fats of the cheese with the alkalies of the panified goods, or with alkalies occurring in the cheese itself, resulting in an unpleasant soapy flavor. Grated cheeses have been on the market for some time, but apparently no one has been able to produce a grated or comminuted cheese containing less than 8 to 10 per cent of moisture, while the ordinary grated cheese usually has a water content of approximately 15 per cent.

I have succeeded in producing a comminuted cheese which contains not more than 3 per cent of moisture and preferably less than one per cent.

Another feature of my invention is that I have produced a comminuted, substantially anhydrous cheese of such an acidity that it tends to neutralize the free alkali of bakery goods with which it may be used, thus further reducing any tendency towards saponification.

Still another feature of my invention is that I have produced a cheese-fat combination containing a very low percentage of moisture and may be substantially anhydrous, which may be used as a filling in bakery goods or may be used as a coating therefor, as above described.

The type of cheese which I prefer to use is an aged "American."

While various methods may be used for drying cheese to be used in connection with my invention, such as dividing the cheese into small pieces and placing it in a drying oven or tunnel at a moderate temperature, the following method of drying and at the same time adjusting the acidity of the cheese has been found especially efficient.

Method of drying cheese

Make up a blend of good aged American cheese, preferably low in moisture. Comminute the mix and heat to a temperature of 165° F., preferably with direct saturated steam. Sufficient water should be added to bring the moisture content up to about 70 per cent, together with sufficient citric or other acid so that the end product has a pH value of about 5.0.

Instead of using water and citric acid or other acid, as described, there is a material advantage in employing an acid whey solution, or an acid milk (whole or skim) may be employed. Also, in place of using citric acid, other acids such as malic acid may be used. However, I prefer to use as the acid source, whey which has been permitted to develop its acid naturally.

During and subsequent to the heating, and after the addition of the acid solution, the mixture is vigorously agitated so as to obtain as uniform a mixture as possible. It is then preferably homogenized and, before cooling, conducted by some suitable form of forced feed apparatus directly to the spray heads of a spray drying equipment such as is used for the desiccation of milk. The end product will be a powder containing about 0.8 per cent of moisture and the acidity should be about pH 5.0, sufficient acid or acid whey having been added, if necessary, to produce this acidity in the end product.

Cheese-fat composition

Although the dried cheese or cheese powder produced as described above may be used independently of any added fatty ingredient, such as on crackers, etc., in my preferred embodiment the dried cheese is combined with a fat, preferably a fat which is solid at room temperatures.

The fats which I have found especially suitable in connection with my invention are anhydrous ones, such as cocoanut or sesame oil, palm oil, and hydrogenated cottonseed or corn oil. Numerous other edible fats which are solid at room temperature will suggest themselves, although, of course, market conditions will be an important factor in determining the choice of fats. In any case, however, it is desirable that the fat chosen is one in which the fat globules are uniformly small in size. This characteristic is true of the fats mentioned above. For the cheese ingredient I prefer to use a dried, snappy, aged American cheese of good quality.

As to proportions, in a preferred embodiment I may use 35 per cent of substantially dry powdered cheese and about 65 per cent of fat. However, these proportions may vary within wide limits and I may use as low as 15 per cent of such cheese or as much as 50 per cent.

My preferred method of combining the cheese and fat is as follows:

Preparation of cheese shortening

The fat is heated to approximately 180 to 190° F., or higher if desired, in a suitable container such as a cheese kettle equipped with agitators. The dried cheese described above, containing from 3 per cent down to less than one per cent of moisture, and which may be either in powdered form or in the form of relatively small lumps or aggregates, is mixed into the fat and the mixture stirred for approximately one-half hour in order to obtain a thorough intermingling of the cheese and fat and to produce a smooth texture in the final product.

As a result of this operation, the dry cheese, if not originally in the form of a finely-divided powder, disintegrates into such a form and each particle becomes thoroughly coated with a fat film. This is of great importance in the production of a smooth product.

The material thus prepared is packed, as by pouring through a nozzle or the like into jars or other suitable containers, and solidifies upon cooling to form a soft, smooth product having a texture and density somewhat similar to a thick mayonnaise or soft butter.

The fat-cheese product described above may be conveniently applied to popcorn, crackers, or the like, by melting in a suitable container and then either pouring or spraying it upon the material to be coated, or it may be spread by means of a knife. It may also be used as a shortener in the usual way, thus imparting a cheese flavor to the baked goods while functioning to shorten the same.

Baked products embodying my invention have a delightful cheese flavor unmasked by the soapy taste common with such goods which have been made prior to my invention.

Many variations and modifications coming within the spirit of my invention will doubtless suggest themselves to those skilled in the art. Hence, I do not wish to be limited to the specific embodiments herein described except to the extent indicated by the appended claims, which are to be interpreted as broadly as the state of the art will permit.

I claim as my invention:

1. The improvement in the art of drying a normally solid cheese which consists in comminuting the cheese, heating and agitating the same in the presence of added water, sufficient heat, agitation and water being employed to produce a smooth emulsion capable, while still heated, of being forced through the nozzles of the spray-drying equipment, and then spray-drying the mixture to convert the same into a dry powder containing not more than about 3 per cent moisture.

2. The improvement in the art of drying a normally solid cheese which consists in comminuting the cheese, heating and agitating the same in the presence of added water, sufficient heat, agitation and water being employed to produce a smooth emulsion containing about 70 per cent of moisture, and capable, while still heated, of being forced through the nozzles of the spray-drying equipment, and then spray-drying the mixture to convert the same into a dry powder containing not more than about 3 per cent moisture.

3. The improvement in the art of making acid powder cheese which consists in comminuting cheese of a normally acid variety, heating and agitating the same in the presence of added water and acid, sufficient heat, agitation, water and acid being employed to produce a smooth emulsion containing about 70 per cent moisture and of materially greater acidity than would be possessed by the cheese under normal conditions, and then spray-drying the material to convert the same into a dry powder containing not more than about 3 per cent of moisture and having a pH value of not more than approximately pH 5.0

FOREST H. CLICKNER.